United States Patent [19]

Stock et al.

[11] Patent Number: 4,773,320

[45] Date of Patent: Sep. 27, 1988

[54] BAKING PAN

[76] Inventors: Wilma L. Stock; Arthur L. Stock, both of Highway 15 North, Armstrong, Iowa 50514

[21] Appl. No.: 122,324

[22] Filed: Nov. 16, 1987

[51] Int. Cl.⁴ ............................................. A47J 37/00
[52] U.S. Cl. ............................... 99/449; 99/DIG. 15; 249/117; 249/DIG. 1
[58] Field of Search ................. 99/449, 426, 430, 432, 99/433, 444, 381, 382, DIG. 15; 249/117, 128, 158, DIG. 1; 220/345; D7/83, 354

[56] References Cited

U.S. PATENT DOCUMENTS

| | | | |
|---|---|---|---|
| 428,792 | 5/1890 | Willey | 249/DIG. 1 |
| 616,871 | 1/1899 | Allen | 249/DIG. 1 |
| 702,203 | 6/1902 | Haffner | 249/DIG. 1 |
| 852,566 | 5/1907 | Lane | 99/DIG. 15 |
| 872,837 | 12/1907 | Mio | 99/449 |
| 993,914 | 5/1911 | Truman | 249/DIG. 1 |
| 1,397,775 | 11/1921 | Neumeister | . |
| 1,547,424 | 7/1925 | Leucht | 249/DIG. 1 |
| 1,645,235 | 10/1927 | Guyer | 249/DIG. 1 |
| 2,411,857 | 12/1946 | Harriss | 99/DIG. 15 |
| 2,522,397 | 9/1950 | Palmer | . |
| 3,580,484 | 5/1971 | Schneider | . |
| 3,695,190 | 10/1972 | Bucholz | 211/188 |
| 3,828,966 | 8/1974 | Martin | 99/449 |
| 4,113,225 | 9/1978 | Corse | 249/DIG. 1 |
| 4,644,858 | 2/1987 | Liotto et al. | . |
| 4,655,430 | 4/1987 | Weber et al. | . |

Primary Examiner—Harvey C. Hornsby
Assistant Examiner—Joseph S. Machuga
Attorney, Agent, or Firm—Henderson & Sturm

[57] ABSTRACT

A baking pan like a conventional baking pan except that the pan has a removable end section which can be used to close one end of the pan when the baked goods are in a pre-cooked condition to prevent batter or the like from leaking out of the pan and yet which can be readily removed when the baked goods are to be served so that every piece of the baked goods can be removed without deforming such piece of baked goods or breaking it into pieces which would destroy the aesthetic presentation thereof.

4 Claims, 1 Drawing Sheet

U.S. Patent    Sept. 27, 1988    4,773,320
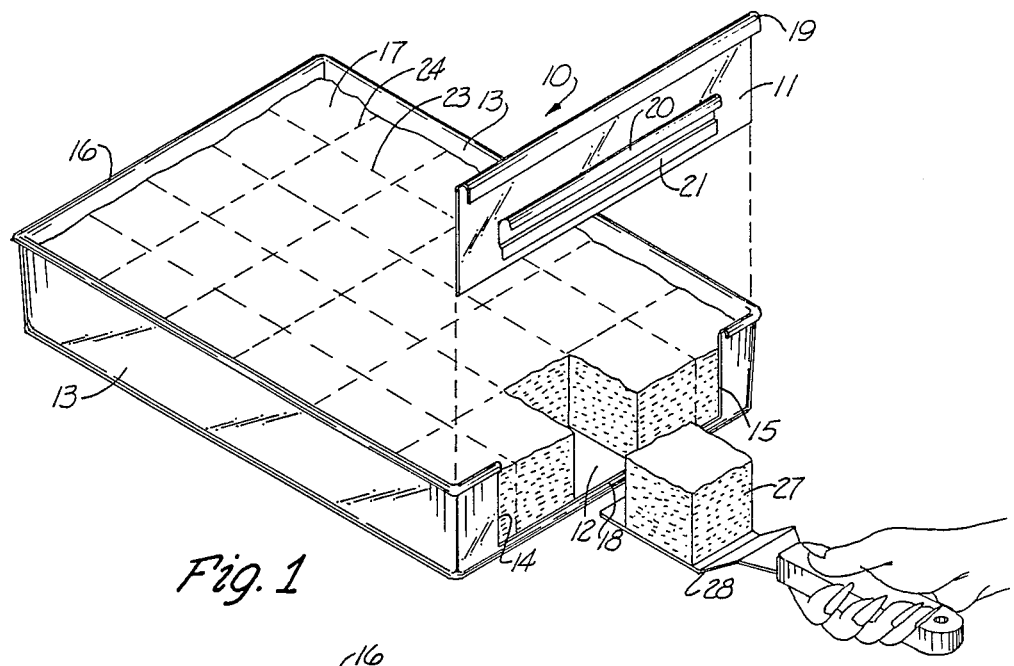
Fig. 1
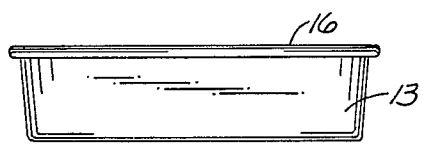
Fig. 2
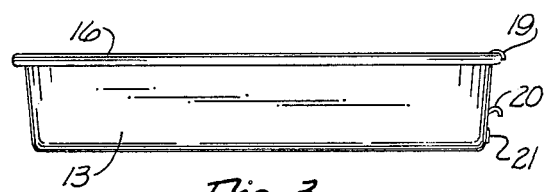
Fig. 3
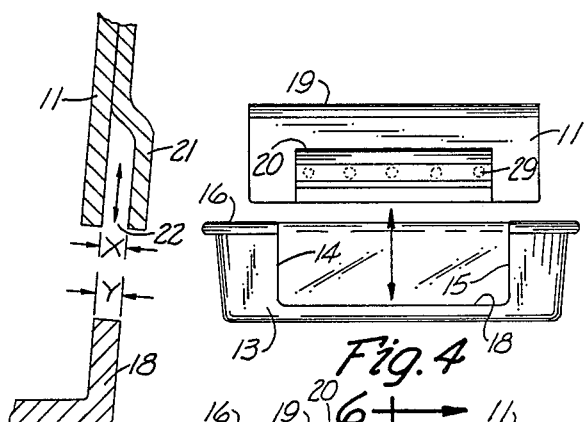
Fig. 4
Fig. 5
Fig. 7
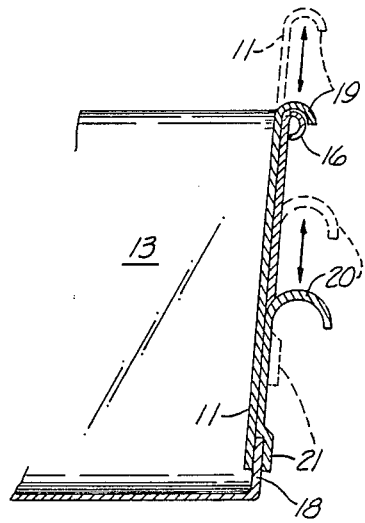
Fig. 6

4,773,320

BAKING PAN

TECHNICAL FIELD

The present invention relates generally to baking pans, and more particularly to a baking pan which allows even the first piece of baked goods from a pan to be removed without damage to that piece or to adjacent pieces of such baked goods.

BACKGROUND ART

When serving a cake or other similar baked goods from a typical conventional baking pan, the cake or other baked goods are cut into pieces and then these pieces are removed one by one with a spatula, cake server, fork or the like. A universal problem with conventional baking pans is that at the time of removal of the first piece of baked goods, it is generally impossible to remove the first piece without mutilating the first piece and at least one adjacent piece of baked goods during the process. While a mutilated piece of cake or other baked goods is still edible, it cannot be served to guests in situations where the presentation of the baked goods is important, such as at certain social occasions or in restaurants or the like.

Consequently, there is a need for a baking pan which will overcome the aforementioned problem.

DISCLOSURE OF THE INVENTION

The baking pan of the present invention is like a conventional baking pan except that the pan has a removable end section which can be used to close one end of the pan when the baked goods are in a pre-cooked condition to prevent batter or the like from leaking out of the pan and yet which can be readily removed when the baked goods are to be served so that every piece of the baked goods can be removed without deforming such piece of baked goods or breaking it into pieces which would destroy the aesthetic presentation thereof.

An object of the present invention is to provide an improved baking pan.

Another object of the present invention is to provide a baking pan which will permit each and every piece of baked goods to be removed from the pan without causing mutilation, especially of the first piece to be removed from the pan.

A further object of the present invention is to provide a baking pan of the aforementioned type which is economical to produce and easy to use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention showing a cake therein which has already been baked and showing how removal of the end permits even the very first piece to be removed without damage to it or to any adjacent piece of cake;

FIG. 2 is an end view of the other end of the pan;

FIG. 3 is a side view of the pan with the removable end in a closed position for baking purposes;

FIG. 4 is an end view of the pan showing the closure gate removed therefrom;

FIG. 5 is a view like FIG. 4, but showing the end closure gate closed for baking purposes;

FIG. 6 is an enlarged partial cross sectional view taken along line 6—6 and showing in dashed lines how the end gate can be removed and showing in solid lines the position of the end gate in a position for accepting batter and baking such batter into a cake or the like; and FIG. 7 is an enlarged partial cross sectional view like FIG. 6, but showing a slot formed on the bottom of the gate and the end lip of the pan over which it seals.

BEST MODE FOR CARRYING OUT THE INVENTION

Referring now to the drawings wherein like reference numerals designate identical or corresponding parts throughout the several views, FIG. 1 shows a pan (10) having an end gate (11) for opening or closing one end thereof.

The pan (10) includes a bottom (12) and first upstanding inner connected sidewall portions (13) which are connected at the bottom thereof to the outer periphery of the bottom (12) and extend around from one end (14) to another end (15). The pan (10) shown in FIG. 1 is similar to a standard 9"×13" baking pan except for the opening in one end thereof and the end gate (11). It will also be understood to those skilled in this art that other sizes or shapes of pans can be utilized, for example a standard 9"×9" pan or even a circular pan with an arcuate shaped end gate therein. The first upstanding inner connected sidewall portions (13) have a curled top peripheral portion (16) extending therearound from the first end (14) thereof to the second end (15) thereof.

The end gate (11) is essentially planar in the preferred embodiment shown in FIG. 1 and has an upper lip (19) which is of a size on the inner portion thereof of approximately the same or slightly less than the top peripheral edge (16) of the first upstanding inner connected sidewall portions (13). As shown in FIGS. 5 and 6, the lip (19) will snap over the top peripheral edge (16).

A curled handle (20) is formed in one piece with a retaining lip (21) to form a slot (22) between the lip (21) and the gate (11) for selectively receiving a second sidewall portion (18). This second sidewall portion (18) is formed in one piece with the bottom (12) and extends upwardly only a short distance to provide an opening between the edges (14) and (15) of the first upstanding inner connected sidewall portions (13).

In operation, when it is desired to bake a cake or the like by using the pan (10), the gate (11) would be moved from the position shown in FIGS. 1 and 4 to the position shown in dashed lines in FIG. 6 and then ultimately into the position shown in solid lines in FIGS. 5 and 6 wherein the second sidewall portion (18) extends into the slot (22) between the lip (21) and the gate (11). Also, the lip (19) will snap over the top peripheral edge (16) adjacent the ends (14) and (15) of the first upstanding inner connected sidewall portions.

The bottom of the gate (11) will be readily sealed because the width of the slot (22) referred to as distance "X" is approximately the same as the width "Y" of the upstanding second sidewall portion (18). The side edges of the gate (11) will also be held tightly against the end wall (13) at a point just to one side of the end walls (14) and (15) thereof. This will prevent batter placed in the pan (10) from running out during the baking process or just prior thereto.

Once the cake (17) or other baked goods is done baking, then at the appropriate time after cooling, the cake (17) will be cut into pieces along the intersecting lines (23) and (24). To serve one of the pieces (27) of the cake (17), the handle (20) would be manually grasped and moved upwardly from the position shown in FIG. 5 to the position shown in FIG. 1. Then a spatula (28) or the like can be utilized to slide under the first piece of cake (27) and such piece (27) can be easily and readily removed without disturbing adjacent pieces of the cake (17). Similarly, the pieces to each side of the piece (27) can also easily be removed through the opening between the ends (14) and (15), after which the other pieces of cake (17) can be easily removed without being mutilated because there will then be plenty of room in the pan, due to the removal of the first few pieces, for the spatula to fit without deforming or disturbing adjacent pieces of cake.

Accordingly, it will be appreciated that the preferred embodiment shown and described herein does indeed accomplish the aforementioned objects. Obviously many modifications and variations of the present invention are possible in light of the above teachings. For example, while the preferred embodiment (10) shown in the drawings is made of a commercial grade of stainless steel, and the handle (20) spot welded thereon by spot welds (29), the pan can also be made of other materials, such as of aluminum wherein the spot welds (29) would be replaced by rivets or of microwave suited materials using related manufacturing techniques. It is therefore to be understood that, within the scope of the appended claims, the invention may be practiced otherwise than as specifically described.

We claim:

1. A baking pan comprising
   a flat bottom having outer peripheral edges;
   first upstanding interconnected sidewall portions integrally connected to the outer peripheral edges of said bottom and extending upwardly therefrom to a top peripheral edge located at a first predetermined height;
   a second sidewall portion integrally connected to said bottom and to said first sidewall portions and extending upwardly to a top edge thereof which is substantially closer to said bottom than to said predetermined height;
   said first sidewall portions having a first end defined by a first edge extending from one end of said top peripheral edge of said first sidewall portions to one end of the top edge of said second sidewall portion;
   said first sidewall having a second end defined by a second edge extending from the other end of said top peripheral edge of said first sidewall portions to the other end of the top edge of said second sidewall portion whereby an opening is formed between the first and second edge of the first sidewall portions and above the top edge of said second sidewall portion; and
   gate means for selectively opening or closing said opening; wherein, said gate means comprises an end gate having an upper lip having a length that is greater than the length of said second sidewall portion; wherein, said upper lip will snap over the top of the peripheral edge of said first upstanding sidewall portions and the end gate will be disposed adjacent to the interior surfaces of said first and said second sidewall portions.

2. The apparatus of claim 1 including means for sealing between the gate means and said top edge of said second sidewall portion to prevent liquid batter from passing out of said opening when said gate is in a closed position wherein said sealing means includes means for forming a slot along the bottom of said gate means for selectively receiving the top edge of said second sidewall portion.

3. The apparatus of claim 1 including holding means for sealingly holding the ends of the gate in sealing contact with the first and second ends of said first sidewall portions for preventing batter from passing out of said opening when said gate is in a closed position; wherein said holding means comprises a lip on top of said gate for extending over both the inside and outside of the top peripheral edge of just above the first and second edges of said first sidewall portions.

4. The apparatus of claim 1 including handle means attached to said gate means for manually grasping said gate means during the opening or closing thereof.

* * * * *